Oct. 3, 1967

J. H. M. VAN DER LANS 3,345,575

PULSE MIDPOINT DETECTOR

Filed April 29, 1964

INVENTOR.
JAN H.M VAN DER LANS
BY
Roland G. Anderson

Oct. 3, 1967  J. H. M. VAN DER LANS  3,345,575
PULSE MIDPOINT DETECTOR

Filed April 29, 1964

INVENTOR.
JAN H.M. VAN DER LANS
BY
Roland A. Anderson

United States Patent Office 3,345,575
Patented Oct. 3, 1967

3,345,575
PULSE MIDPOINT DETECTOR
Jan H. M. van der Lans, East Patchogue, N.Y., assignor to the United States of America as represented by the United States Atomic Energy Commission
Filed Apr. 29, 1964, Ser. No. 364,069
4 Claims. (Cl. 328—108)

ABSTRACT OF THE DISCLOSURE

Transistorized pulse detection apparatus for locating accurately the midpoints of successive input pulses. A pair of pulses identical to each input pulse are formed which are slightly out of phase and a step wave is formed beginning at a point where the second pulse exceeds in amplitude the first pulse. Thus the beginning point of each step wave locates the center of each input pulse by being out of phase with the latter an identical distance.

---

The invention described herein was made in the course of, or under a contract with the U.S. Atomic Energy Commission.

The present invention relates to pulse midpoint detection apparatus and more particularly to pulse midpoint detection apparatus useful for locating accurately the midpoint of symmetrically shaped pulses.

In the operation of the Alternating Gradient Synchrotron located at the Brookhaven National Laboratory (BNL) a bubble chamber is frequently used to locate, identify and track various sub-atomic particles released during the course of experiments. Photographs of the bubble chamber are taken in rapid succession, for example, each 2½ seconds, the tracks of the various particles being identified or formed by a series of small bubbles produced in the path of each particle as it travels through the bubble chamber medium. In view of the large number of photographic negatives which must be taken to record the events, preparation of data taken from the photographic negative is now accomplished automatically through the use of mechanical and electrical devices for scanning the photographs and converting the information in a form suitable for study and analysis. A machine now in use at BNL with a bubble chamber is the so-called Hough-Powell Digitizer which scans the negatives automatically with a spot of light. The light beam is sensed through each bubble on the negative by a sensing device and provides the information in digital form for screening and review by available computer apparatus coded to search out specific information.

One of the problems encountered in adapting such equipment to the scanning of the negatives having particle tracks formed by bubbles is to locate accurately each bubble. Since the bubbles appear in a variety of sizes and the scanning light in addition may cross each bubble along a different segment the most obvious ways of accomplishing this result do not produce results of the desired accuracy. This includes techniques in which the beginning of a pulse is identified with a certain specified rise in amplitude or where the slope passes through zero. In the former case, the base line can vary and predetermined amplitude rises have different significance with different size bubbles. In the latter situation, the slope does not pass through zero in a sharp enough width of pulse so this is subject to excessive variation.

In a typical bubble chamber as mentioned above, a bubble on the film has a diameter typically in the range of 30–40µ. The flying spot of light scans the film and locates each bubble which is detected by a photomultiplier tube on the other side of the film, converting the light into an electrical signal. This signal has a certain width which depends upon the speed of the light spot and an amplitude which depends upon the blackness of the film and the area of the bubble covered by spot. A track center circuit is then required to determine the center of this pulse and thereby the location of the bubble with accuracy sufficient for the intended analysis.

Heretofore the track center circuit in use has been one which relied on the center of the area of the pulse to avoid some of the disadvantages of the early techniques described above. In accordance with the area concept of midpoint location, the signal from the photomultiplier is integrated and the level obtained is stored temporarily. The integral is also delayed and doubled. When the delayed and doubled integral crosses the level of the first stored signal a track center step signal is generated and a track center pulse is derived, provided other conditions, not mentioned here, are met. This arrangement has some severe disadvantages. First, it is unable to separate overlapping bubbles so that the track center pulse has no meaning in such a situation. Second, linear operation of the integrator over the whole range of pulses with different width and amplitude is hard to achieve. Further, the track center circuit can not "see" or recognize the second of two closely spaced bubbles due to the holding time of the first integral, although this can be circumvented by a more elaborate arrangement involving the use of this circuit in pairs. Finally, for bubbles with a certain separation a spurious "in between" pulse is generated, having the effect of introducing a spurious track segment.

This invention overcomes the above enumerated disadvantages of the track center circuit which has been in use up to now. I have provided a circuit of relative simplicity which does not produce meaningless track center pulses and in which the resolution is limited not by the circuit but only the spacing of grating lines used to digitize the location of the flying spot of light. In my arrangement, integration with its inherent dead time is abandoned in favor of differentiation.

It is thus a first object of this invention to provide a circuit for locating the midpoint of a pulse.

A further object of this invention is to provide apparatus for the detection and locating the midpoints of closely spaced pulses.

Still another object of this invention is to provide apparatus for the location of the midpoints of pulses without introducing spurious signals.

Other objects and advantages of this invention will hereinafter become more obvious from the following description of a preferred embodiment of this invention taken with the accompanying drawings in which.

Figure 1:
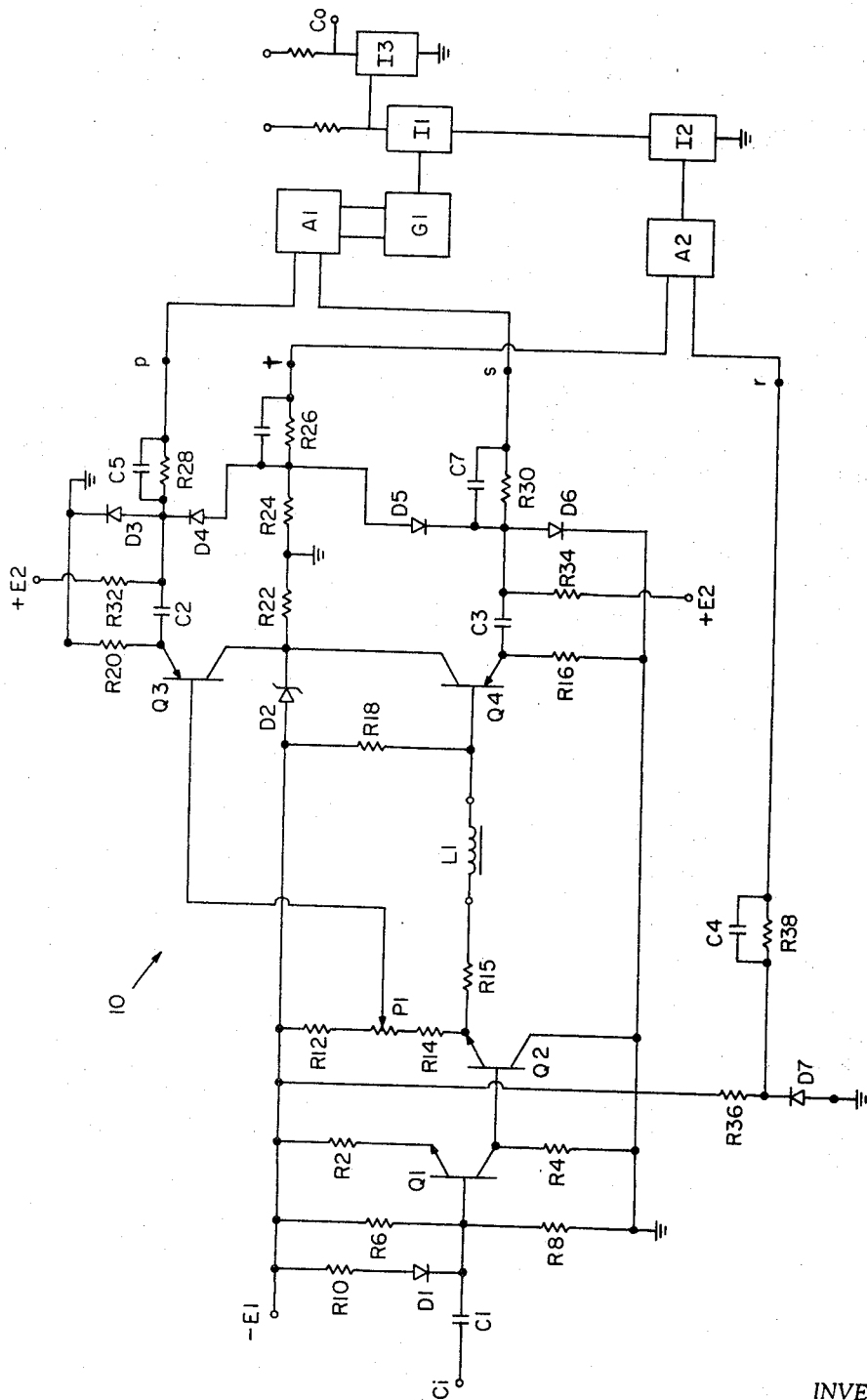
FIG. 1 shows a preferred embodiment of this invention.

Referring to FIG. 1 for a preferred embodiment of this invention there is shown a track center circuit 10 receiving its input signal on a contact Ci. The output of circuit 10 is delivered on contact Co.

Figure 2:
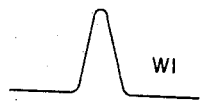
FIGS. 2–6 show the various waves produced by the circuit of FIG. 1 and illustrate how the midpoint of an incoming wave is located.

The input pulse to circuit 10 which appears on contact Ci is produced by a photomultiplier circuit (not shown) and has the general, symmetrical shape of the pulse or wave W1 shown in FIG. 2. The purpose of the circuit to be now described is to produce on contact Co a spike or narrow pulse which indicates the exact midpoint of pulse or wave W1. Input wave W1 is received through capacitor C1 on the base of a transistor Q1 which is an inverter with a fixed gain of two. Its emitter is connected to source −E1 through a resistor R2. The collector is connected to ground through a resistor R4. A pair of resistors R6 and R8 connected between source −E1, the base of transistor Q1, and ground establish the base line or non-input state of the circuit. A resistor R10 and a diode D1 from source $-E1$ to the base of transistor Q1 limit negative voltage swings on the latter and provides for D.C. restoration. The output of transistor Q1 on its collector is a wave or pulse about double the amplitude of pulse W1 and inverted. This inverted wave becomes the input to the base of a transistor Q2 which has its collector grounded and its emitter connected to source $-E1$ by way of a voltage dividing network consisting of resistors R12 and R14, and potentiometer P1. The output of transistor Q2, which is a wave like that of wave W1 inverted is delivered by way of a resistor R15 and a delay line L1 to the base of a transistor Q4. Resistor R15 is selected to halve the amplitude of the output from transistor Q2. Delay line L1 has the characteristics necessary to introduce a delay of some value such as $\delta$. At the same time, potentiometer P1 picks off a duplicate of the wave output of transistor Q2 for delivery to the base of a transistor Q3. Potentiometer P1 would be adjusted to insure a wave having the identical amplitude as that delivered to transistor Q4.

Figure 3:
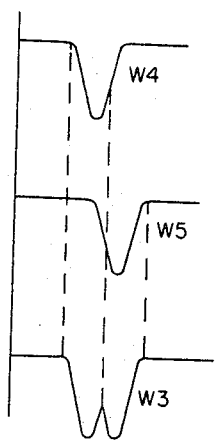

Transistor Q4 has its emitter connected to ground through a resistor R16, its base supplied from source $-E1$ through a resistor R18, and its collector connected to the collector of transistor Q3. Transistor Q3 has its emitter connected to ground through a resistor R20. From the common connection of the collectors of transistors Q3 and Q4 a mixed output wave W3 is taken to a contact $t$ through resistors R22, R24, and R26. The output of transistor Q3 is taken from its emitter through a capacitor C2 and a resistor R28 on a contact $p$ in the form of a pulse or wave W4. The output of transistor Q4 is taken from its emitter through a capacitor C3 and a resistor R30 to a contact $s$ and has the shape of a wave W5. It will be seen from FIG. 3 that waves W4 and W5 are identical except that the latter lags the former by $\delta$ introduced in delay line L1 and that wave W3 is a composite of waves W4 and W5.

A zener diode D2 is located between $-E1$ and the collectors of transistors Q3 and Q4 to maintain a constant voltage at the collectors. The current variation across resistor R22 to ground as shown is converted thereby to a voltage variation on contact $t$. A resistor R32 between a source of $+E2$ and one end of capacitor C2 and a diode D3 to ground maintains the base line of wave W4 substantially at ground (D.C. restoration). Diodes D4, D5, and D6 connected as illustrated between resistors R28 and R26, R26 and R30, and R30 to ground accomplish the same result so that all of the waves can be compared with identical D.C. levels. A resistor R34 connected to source $+E2$ as shown does the same for wave W5. A threshold voltage of $-Vt$ slightly less than ground is provided by a small drop in diode D7 and is placed on contact $r$. Resistor R36 between diode D7 and $-E1$ provides for the current flow and resistor R30 transfers the voltage to contact $r$.

Figure 4:
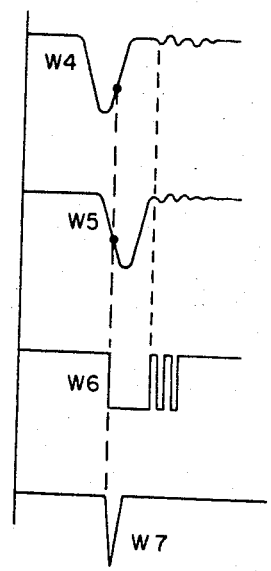

Waves W4 and W5 taken from contacts $p$ and $s$ are delivered to a differential amplifier A1 which produces a step voltage or wave W6 during the period of time when the amplitude of wave W5 exceeds that of W4, as shown in FIG. 4. The short steps following wave W6 are due to fluctuations in the base lines following waves W4 and W5 as is understood in the art. The leading edge of wave W6 represents the midpoint of wave W1 displaced by one-half the original time delay introduced by delay line L1 or $(\frac{1}{2})\delta$. Pulse generator G1 receives wave W6 and produces a narrow spike W7 at the leading edge of wave W6 as is understood in the art.

Figure 5:
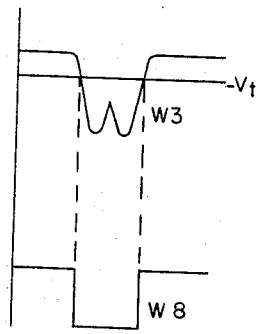

A second differential amplifier A2 receives the threshold voltage $-Vt$ and composite wave W3 and produces a square wave W8 during the period that the amplitude of W3 exceeds that of $-Vt$, as illustrated in FIG. 5. The purpose of this arrangement is to obtain a wave whose length is unambiguous, to avoid the effect of a ripple at the end of wave W3 and some uncertainty generally in where the wave actually begins.

Figure 6:
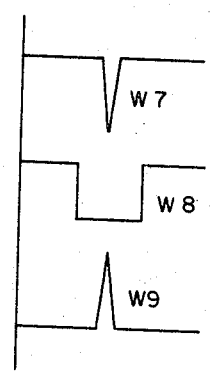

Spike wave W7 from generator G1 and square wave W8 from amplifier A2 are sent to a pair of inverters I1 and I2, respectively, which will produce an inverted spike W9 when the two coincide, as shown in FIG. 6. Inverters I1 and I2 act as a logic AND circuit, passing through a signal only when they both receive signals simultaneously. This arrangement is provided to set a threshold and thereby eliminate very small signals and prevent pulses caused by multiple crossings at the return of the signal to the base line to enter the digitizing circuitry. A third inverter I3 is provided, if desired, to reverse the polarity of the signal delivered to contact $Co$. Therefore, the narrow wave produced on contact $Co$ indicates exactly the midpoint of incoming wave W1 on contact $Ci$ except for a displacement of $(\frac{1}{2})\delta$ which is the same for all sizes of incoming waves, provided the incoming wave is symmetrical.

In the operation of the apparatus described it will be seen that once potentiometer P1 is adjusted to provide identical waves W4 and W5, the arrangement will produce on the output contact $Co$ a narrow wave indicating the midpoint of input wave W1 on contact $Ci$. There will be a slight displacement in time but the displacement will be identical for all incoming waves which therefore can be taken into account by using the information provided.

Suitable parameters for the arrangement shown in FIG. 1 are given in the table below, for illustrative purposes only:

*Table*

| | |
|---|---|
| E1 | volts__ 30 |
| E2 | do____ 10 |
| E3 | do____ 0.35 |
| R2, R10, R16, R20 | 1K |
| R4 | 2K |
| R6 | 56K |
| R8 | 560K |
| R12, R14, R15, R18 | 2.2K |
| R22, R36 | 3.3K |
| R24 | 15K |
| R26, R28, R30, R38 | 1.5K |
| R32, R34 | 33K |
| C1 | 0.01 |
| C2, C3 | 0.01 |
| C4, C5, C6, C7 | 0.001 |
| Q1, Q2 | 2N699 |
| Q3, Q4 | 2N1132 |
| D1, D3, D4, D5, D6, D7 | 1N100 |
| D2 | 1N751A |
| P1 | ohms__ 500 |

It is thus seen that there has been provided a unique and simple arrangement for accurately locating the midpoint of a symmetrical pulse. The circuit as described has no inherent dead time so that resolution is limited only by other parts of the system. Accuracy of this arrangement has been tested and the RMS of the deviation never exceeded 3.6$\mu$.

It is understood of course that changes in the described arrangement may be made without departing from the principles of this invention. Therefore the scope of this invention is to be defined and limited only by the appended claims.

I claim:
1. In a symmetrical pulse midpoint detector, the combination comprising means for producing first and second identical waves, means delaying the second wave slightly so that the midpoints of said waves are separated less than half the width of said waves, means for producing a step wave during the period the amplitude of the second wave is greater than the amplitude of the first wave, means for producing a spike wave at the beginning of said step wave locating the midpoint of said input wave dis- placed by half the delay introduced by said delaying means, and means to block spurious signals from producing a false output of said detector.

2. The midpoint detector of claim 1 in which said blocking means includes means to form a composite wave from said first and second identical waves, means to form a square wave when the amplitude of the composite exceeds a predetermined value exceeding the amplitudes of possible spurious signals, and means to pass said spike wave only in the presence of the last named square wave.

3. The midpoint detector of claim 2 in which the means for producing the first and second identical waves includes means to adjust the amplitude of said first identical wave to match it exactly with said second identical wave.

4. In a pulse midpoint detector, the combination comprising means for receiving a symmetrically shaped input pulse and producing on separate contacts first and second identical pulses of differing phase and a third pulse which is a composite of said first and second pulses, means producing a threshold voltage below the peak amplitude of said pulses, means for receiving said first and second identical pulses and producing in response thereto a first step wave during the period that the amplitude of said second pulse exceeds that of said first pulse, means for comparing said composite pulse and said threshold voltage and producing a second step wave during the period that the amplitude of said composite pulse exceeds that of said threshold voltage, means for producing a spike wave at the beginning of said first step wave, and means for comparing said spike wave and said second step wave to produce a spike wave when these waves coincide to indicate the midpoint of the input pulse.

References Cited
UNITED STATES PATENTS

| | | | |
|---|---|---|---|
| 2,701,305 | 2/1955 | Hopper | 328—116 |
| 3,130,371 | 4/1964 | Copeland | 328—117 |
| 3,254,230 | 5/1966 | Wahrer | 307—88.5 |

ARTHUR GAUSS, *Primary Examiner.*

J. BUSCH, *Assistant Examiner.*